US005694673A

United States Patent [19]

Yamada et al.

[11] Patent Number: 5,694,673

[45] Date of Patent: Dec. 9, 1997

[54] METHOD OF MANUFACTURING RADIATION IMAGE INTENSIFIER

[75] Inventors: Hitoshi Yamada, Otawara; Shozo Sato, Sagamihara; Hiroshi Kubo, Utsunomiya; Atsuya Yoshida, Otawara, all of Japan

[73] Assignee: Kabushiki Kaisha Toshiba, Kawasaki, Japan

[21] Appl. No.: 551,966

[22] Filed: Nov. 2, 1995

Related U.S. Application Data

[62] Division of Ser. No. 328,790, Oct. 28, 1994, Pat. No. 5,506,403.

[30] Foreign Application Priority Data

| | | | |
|---|---|---|---|
| Oct. 29, 1993 | [JP] | Japan | 5-272615 |
| Dec. 1, 1993 | [JP] | Japan | 5-301923 |
| Sep. 13, 1994 | [JP] | Japan | 6-218507 |

[51] Int. Cl.$^6$ ..... B23P 25/00

[52] U.S. Cl. ..... 29/458; 29/460; 29/527.2

[58] Field of Search ..... 29/458, 460, 525.14, 29/527.2

[56] References Cited

U.S. PATENT DOCUMENTS

| | | | |
|---|---|---|---|
| 4,331,898 | 5/1982 | Shimizu et al. | 250/214 VT |
| 4,740,683 | 4/1988 | Noji et al. | 250/214 VT |
| 4,870,473 | 9/1989 | Sugimori | 250/214 VT |

FOREIGN PATENT DOCUMENTS

| | | |
|---|---|---|
| 56-45556 | 4/1981 | Japan . |

*Primary Examiner*—David P. Bryant

*Attorney, Agent, or Firm*—Oblon, Spivak, McClelland, Maier & Neustadt, P.C.

[57] ABSTRACT

An X-ray image intensifier has a vacuum envelope consisting of glass, and an input window consisting of aluminum and having a sectional meridian radius of curvature which increases from the central portion of the input window to the peripheral portion thereof is arranged on the input side of the vacuum envelope with a metal holding ring and a Kovar ring. An input phosphor surface is arranged adjacent to the inner surface side of the input window, and an X-ray image incident through the input window is converted into a photoelectron image. In order to minimize an influence caused by scattering of X-rays or γ-rays incident through the input window, an input substrate is brought as close to the input window as possible. A coaxial cylindrical focusing electrode and an annular focusing electrode are arranged on the side wall in the vacuum envelope, and an anode is arranged on an output end side. An output window is formed on the output side of the anode, and an output phosphor member is arranged on the inner surface side of the output window. A transmittance with respect to a radiation beam increases in inverse proportion to the energy of the radiation beam. A transmittance abruptly increases in an area extending from the intermediate portion of the input window to the outermost periphery of the input window.

5 Claims, 12 Drawing Sheets

METHOD OF MANUFACTURING RADIATION IMAGE INTENSIFIER

This is a Division of application Ser. No. 08/328,790 filed on Oct. 28, 1994 now U.S. Pat. No. 5,506,403.

BACKGROUND OF THE INVENTION

1. Field of the Invention

The present invention relates to a radiation image intensifier for converting a radiation image into a visible light image or an electrical image signal and to a method of manufacturing the same. Note that a radiation beam, serving as a target of the present invention, for exciting an input screen is a radiation beam, in a wide sense, including X-rays, α (alpha)-rays, β (beta)-rays, γ (gamma)-rays, a neutron beam, an electron beam, heavily charged particle beam, or the like.

2. Description of the Related Art

As a typical radiation image intensifier, an X-ray image intensifier will be described below. The X-ray image intensifier is useful to examine the internal structure of a human body or an object and is used to convert, into a visible light image or an electronic image signal, a radiation image from a fluoroscopy system or a radiograph system for examining the transmission concentration distribution of a radiation beam radiated on the human body or the object.

An X-ray image intensifier is demanded to efficiently convert an X-ray image into a visible light image or an electrical image signal while the contrast or resolution of the X-ray image is kept with a sufficient fidelity. In practice, the degree of fidelity depends on the performances of the constituent elements in the X-ray image intensifier. In particular, since an X-ray input part has conversion characteristics inferior to those of the output screen part, the degree of fidelity of an output image largely depends on the characteristics of the input screen part. In the structure of the input screen part which is conventionally used, i.e., in a structure in which a thin aluminum substrate is arranged inside the X-ray incident window of a vacuum vessel and a phosphor layer and a photocathode layer serving as an input screen adheres to the rear surface of the substrate, a total transmittance of X-rays incident on the input screen becomes low, and X-rays are frequently scattered at the incident windows. For this reason, characteristics having a sufficiently high contrast and a sufficiently high resolution cannot be easily obtained.

Therefore, a known structure for causing an input screen constituted by a phosphor layer and a photocathode layer to directly adhere to the rear surface of the X-ray incident window of the vacuum vessel had been already described in Jpn. Pat. Appln. KOKAI Publication No. 56-45556 or European Pat. Appln. KOKAI Publication No. 540391A1. In such a structure, the X-ray incident window of a vacuum vessel has a substrate which permits the X-rays to penetrate therethrough. For this reason, a decrease in transmittance with respect to incident X-rays and scattering of X-rays can be suppressed, and characteristics having a relatively high contrast and a relatively high resolution can be obtained.

The shape of the input screen constituted by a phosphor layer and a photocathode layer is designed as to be curved shape optimal to minimize deformation of an image plane formed on an output screen by an electron lens system. For this reason, the shape of the input screen is designed to be a paraboloid or a hyperboloid more frequently than a shape having a single radius of curvature.

Although a structure for causing an input screen constituted by a phosphor layer and a photocathode layer to directly adhere to the rear surface of the X-ray incident window of a vacuum vessel is widely known as a technique, this structure is not in practical use. A main reason why the structure is not used in practice is as follows. That is, since the X-ray incident window is deformed by the atmospheric pressure, the input screen does not stably adhere to an X-ray incident window of the vacuum vessel, or an image plane formed by an electron lens system is easily deformed. In a general X-ray image intensifier, even when an electron lens system including an input screen is optimally designed, when the input screen is partially deformed and moved on the vacuum side or the atmospheric pressure side by, e.g., 0.5 mm, a satisfactory output image cannot be obtained due to the deformation of the electron lens system.

Note that, in order to obtain a high resolution and high X-ray detection efficiency, the input screen, especially, the X-ray exciting phosphor layer is formed by vacuum deposition to have a small columnar crystal structure having a relatively large thickness. However, in a method of performing vacuum deposition such that an X-ray incident window is inserted into a film forming apparatus, the crystal structure of an obtained phosphor layer is largely influenced by the substrate temperature of the X-ray incident window. For example, a phosphor layer consisting of sodium-activated caesium iodide (CsI) is deposited to have a thickness of about 400 μm. For this reason, an increase in substrate temperature caused by heat of sublimation or heat radiated from an evaporation unit when the evaporated material adheres to the substrate of the incident window cannot be neglected. When the phosphor layer having a desired thickness is to be formed within a short time, the substrate temperature abruptly increases, satisfactorily thin columnar crystal grains cannot be obtained. When the thickness of the incident window is made thinner to increase the transmittance with respect to incident X-rays, an increase in substrate temperature of the incident window during formation of the phosphor layer becomes conspicuous. For this reason, satisfactorily thin columnar crystal grains cannot be obtained.

In order to avoid the above problems, an amount of material adhering to the substrate may be decreased per unit time. However, in this case, a deposition time required for depositing the layer having a desired thickness becomes very long. Therefore, this method is not practical.

SUMMARY OF THE INVENTION

It is an object of the present invention to provide a radiation image intensifier which suppresses deformation of an X-ray incident window, of a vacuum vessel, to which an input screen directly adheres, and has a preferable contrast and preferable resolution characteristics such that the uniformity of a radiation transmittance is rarely degraded.

It is another object of the present invention to provide a method of manufacturing a radiation image intensifier capable of forming an input screen having desired performance.

According to the present invention, there is provided a radiation image intensifier in which the sectional meridian radius of curvature of a radiation incident window having an input screen directly adhering to the inner surface of the radiation incident window at the peripheral portion of the radiation incident window is set to be larger than that at the central portion of the radiation incident window, the thickness of the radiation incident window at the peripheral portion is larger than that at the central portion.

According to the present invention, there is provided a manufacturing method in which a convex-spherical radiation incident window having a peripheral portion joined to a support frame is attached to a reduced-pressure vessel of a film forming apparatus for forming an input screen such that the radiation incident window serves as part of the wall of the reduced-pressure vessel, the pressure in the reduced-pressure vessel is decreased to a predetermined pressure, and an input screen is formed on the inner surface of the radiation incident window.

According to the present invention, since the sectional meridian radius of curvature of the radiation incident window at the peripheral portion of the radiation incident window is set to be larger than that at the central portion of the radiation incident window, a decrease in radiation transmittance at the peripheral portion can be effectively suppressed compared with a decrease in radiation transmittance at the central portion. On the other hand, since the thickness of the radiation incident window at the peripheral portion is set to be larger than that at the central portion, deformation of the incident window at the peripheral portion can be suppressed, peeling of an input screen or deformation of an electron lens system can be suppressed. In this manner, a radiation image intensifier having a preferable contrast and preferable resolution characteristics such that the uniformity of the radiation transmittance is rarely degraded can be realized.

In addition, according to the manufacturing method of the present invention, in the step of forming an input screen, the temperature of a convex-spherical radiation incident window which is exposed to the outer air can be directly controlled. For this reason, an input screen having desired characteristics can be manufactured with good reproducibility. For example, in the conventional method of manufacturing a film, the temperature of the incident window could not be easily kept at about 180° C. or less when a time required for deposition was 2 hours, and the temperature of the incident window could not be easily kept at about 160° C. when a time required for deposition was 5 hours. For this reason, the mean diameter of the resultant columnar crystal grains was about 10 μm. In contrast to this, according to the present invention, the temperatures of the incident window during formation of a film could be accurately controlled to be almost desired temperatures and to have a desired distribution. For this reason, the mean diameter of the resultant columnar crystal grains was about 6 μm, and a high resolution could be realized. In addition, the temperatures of the areas of the incident window were set to have a proper distribution and were changed with time as needed. For example, the mean diameter of columnar crystal grains at the peripheral portion was set to be larger than that at the central portion, or, in contrast to this, the mean diameter of the columnar crystal grains at the peripheral portion was set to be smaller than that at the central portion, and the thickness at the peripheral potion was set to be larger than that at the central portion. In this case, the X-ray detection efficiency and resolution of the peripheral portion could be increased.

Moreover, since the state of the radiation incident window during formation of an input screen by vacuum deposition is almost equal to the state of the radiation incident window influenced by the same atmospheric pressure as that acting on a completed image intensifier, the film formation state of the input screen is almost equal to the state of the input screen of the completed image intensifier. For this reason, the film structure or conversion characteristics of the input screen can be prevented from being degraded. In addition, when the sectional meridian radius of curvature of the radiation incident window at the peripheral portion is set to be larger than that at the central portion, and the thickness of the radiation incident window at the peripheral portion is set to be larger than that at the central portion, a decrease in radiation transmittance at the peripheral portion can be considerably suppressed compared with a decrease in radiation transmittance at the central portion. Deformation of the incident window caused by the atmospheric pressure can be suppressed accordingly. Therefore, degradation of the uniformity of the radiation transmittances of all the areas of the incident window can be suppressed, and peeling of the input screen and deformation of the electron lens system can be suppressed. In this manner, a radiation image intensifier having a preferable contrast and preferable resolution characteristics while suppressing degradation of the uniformity of the radiation transmittances can be realized.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE PREFERRED EMBODIMENTS

A radiation image intensifier according to the present invention and a method of manufacturing the radiation image intensifier will be described below with reference to the accompanying drawings.

Figure 1A:
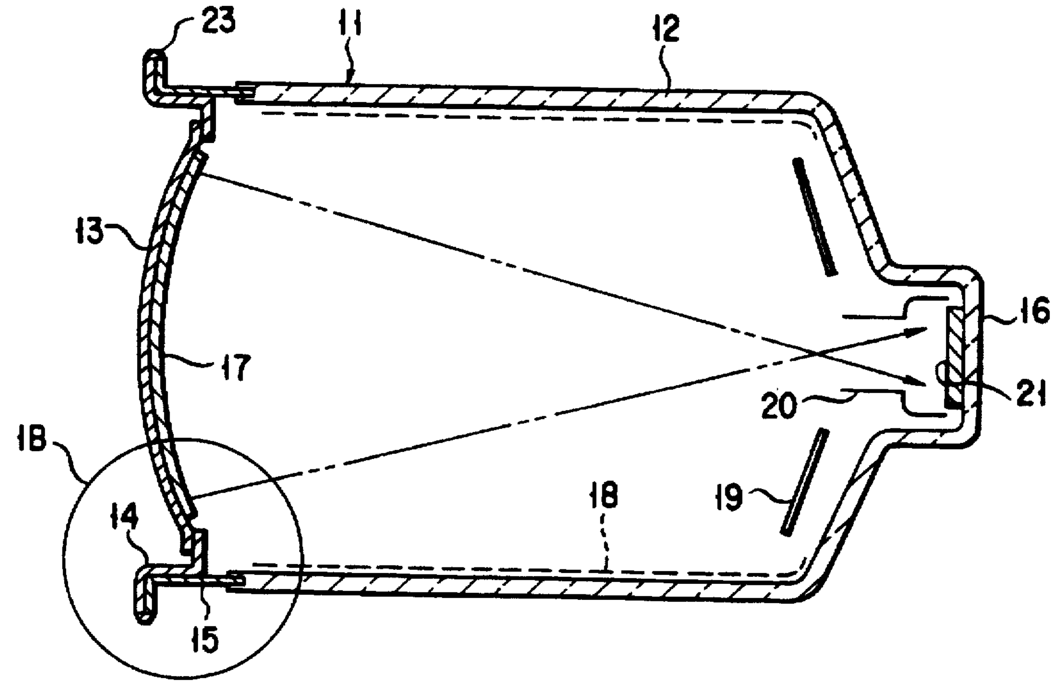
FIG. 1A is a schematic longitudinal sectional view showing an X-ray image intensifier according to an embodiment of the present invention.
Figure 1B:
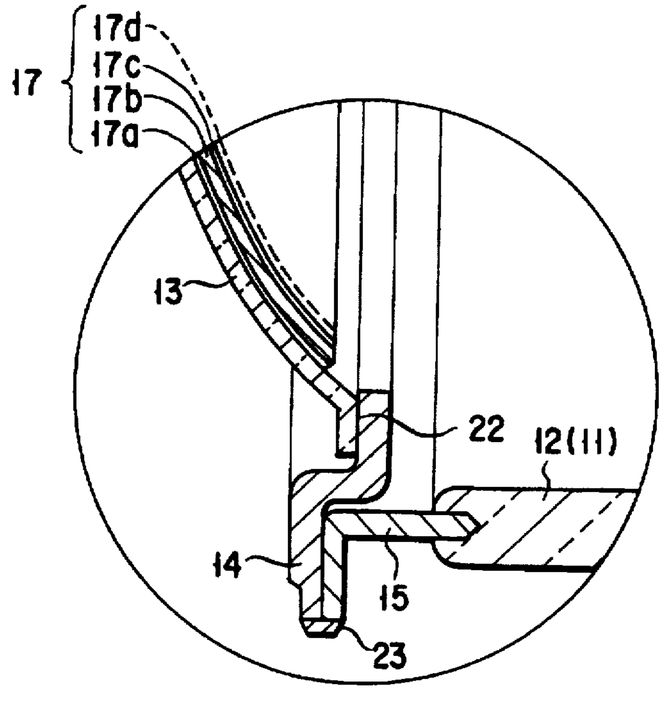
FIG. 1B is an enlarged longitudinal sectional view showing part of the X-ray image intensifier in FIG. 1A.

An X-ray image intensifier, according to an embodiment of the present invention, having an input screen whose effective maximum diameter is about 230 mm is shown in FIGS. 1A and 1B. FIG. 1B is an enlarged view showing part of FIG. 1A, and the enlarged part of FIG. 1B is shown as FIG. 1B in FIG. 1A. As shown in FIG. 1A, a vacuum vessel 11 has a cylindrical housing 12 consisting of glass, an X-ray incident window 13, a high-strength support frame 14 for airtightly joining the cylindrical housing 12 to the X-ray incident window 13, a sealing and adhering metal ring 15, and an output window 16 consisting of transparent glass. The X-ray incident window 13 serving as part of the vacuum vessel has a curved surface whose central portion projects to the outer air side, and an input screen 17 directly adheres to the inner surface of the X-ray incident window 13 on the vacuum space side. A plurality of focusing electrodes 18 and 19 constituting an electron lens system and an cylindrical anode 20 to which a high acceleration voltage is applied are arranged inside the vacuum vessel 11, and an output screen 21 adjacent to the anode of the output window 16 and having a phosphor layer excited by electrons is arranged inside the vacuum vessel 11.

The X-ray incident window 13 of the X-ray image intensifier arranged as described above will be manufactured as follows.

Figure 2:
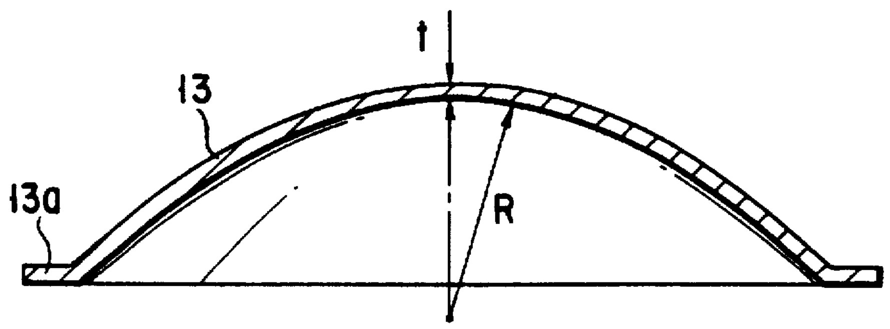
FIG. 2 is a longitudinal sectional view showing an X-ray incident window in FIGS. 1A and 1B.

As the material of the X-ray incident window 13, an aluminum or aluminum-alloy thin plate is used. As shown in FIG. 2, this thin plate is subjected to a press process to form a flat flange portion 13*a*. The X-ray incident window 13 has a central portion projecting to the outer air side, the predetermined distribution of radii R of curvature, and the predetermined distribution of thicknesses t, and the flange portion 13*a* extends from the outer circumferential portion of the thin plate in the lateral direction.

Figure 3:
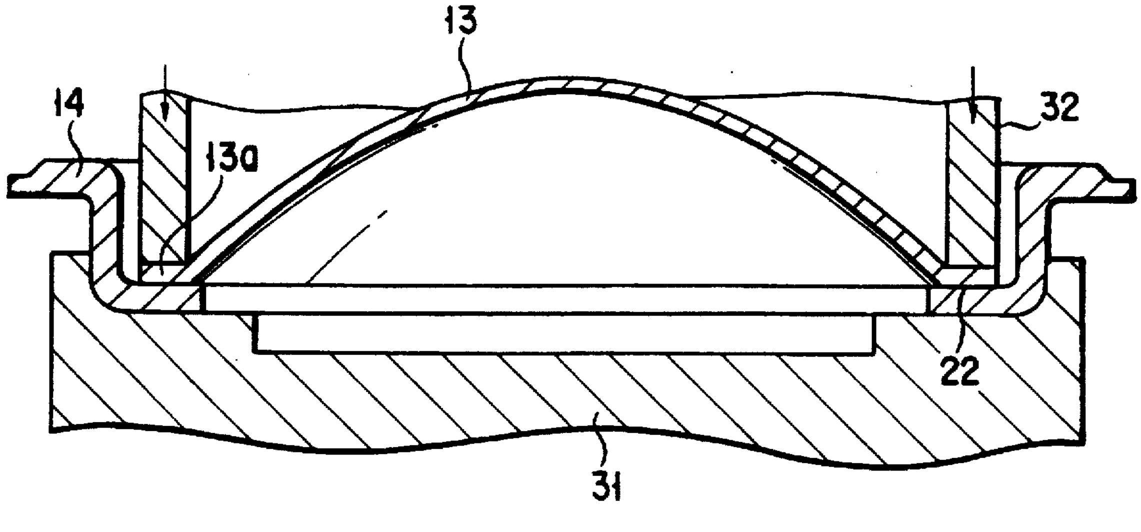
FIG. 3 is a longitudinal sectional view showing the joined state between the X-ray incident window and a support frame shown in FIG. 2.

As shown in FIG. 3, the flat peripheral flange portion 13*a* of the X-ray incident window 13 is placed on the high-strength metal support frame 14 constituted by an iron-alloy plate such as a iron plate or a stainless steel plate which has a thickness larger than that of the incident window and is plated with nickel in advance. The flange portion 13*a* and the support frame 14 are arranged between a pair of upper and lower press die units 31 and 32, and the flange portion 13*a* and the support frame 14 are heated and pressed to be airtightly joined to each other. An airtightly joined portion obtained by the thermal pressure joining operation is indicated by reference numeral 22. Note that such an airtight joining operation may also be performed by the following method. That is, a thin ring may be sandwiched between the peripheral flange portion 13*a* and the support frame 14, and the peripheral flange portion 13*a* and the support frame 14 are brazed to each other while a low pressure is applied to the peripheral flange portion 13*a* and the support frame 14.

Figure 4:
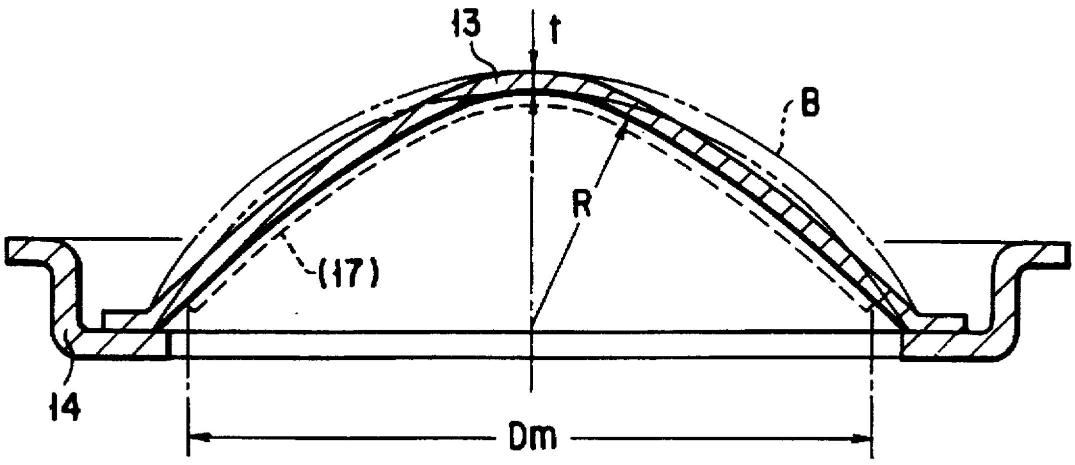
FIG. 4 is a longitudinal sectional view showing an X-ray incident window obtained by joining in FIG. 3.
Figure 5:
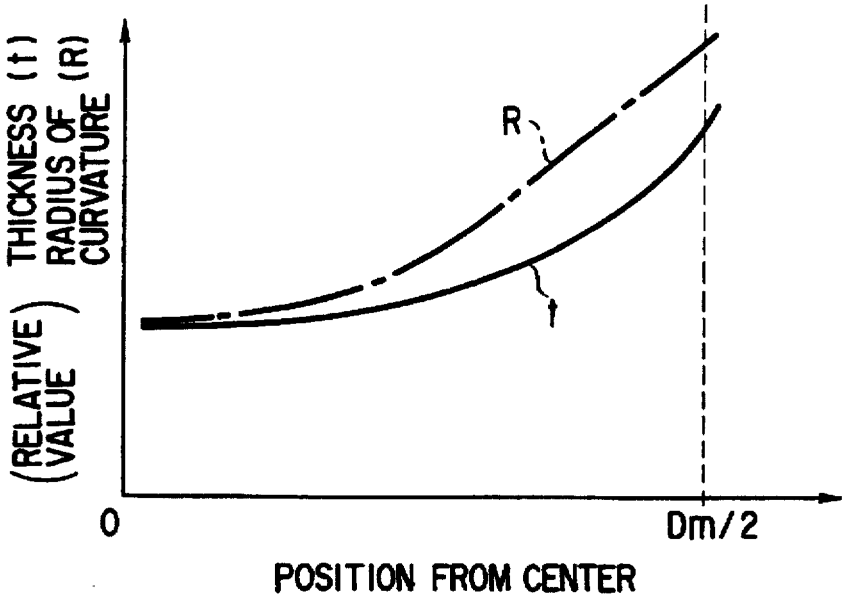
FIG. 5 is a graph showing the distributions of the radii of curvature and thicknesses of the X-ray incident window shown in FIG. 4.

As indicated by a dotted line 17 in FIG. 4, an input screen 17 is adhered and formed, by a film forming method using a film forming apparatus (to be described later), on the inner surface of the X-ray incident window 13 joined to the high-strength support frame 14. In this case, in the X-ray incident window 13, as shown in FIGS. 4 and 5, the sectional meridian radius R of curvature at the peripheral portion of the X-ray incident window 13 is larger than that at the central portion of the X-ray incident window 13 and continuously changes to that at the central portion. In this case, the peripheral portion indicates a range from the effective outermost periphery to a position having about 70% of the effective maximum diameter Dm of the input screen 17. A curve B indicated by a chain double-dashed line in FIG. 4 indicates an X-ray incident window which has a curved surface having a single radius of curvature to compare this X-ray incident window with the X-ray incident window 13 of this embodiment indicated by a solid line. The thickness t of the X-ray incident window 13 at the peripheral portion is larger than that at the central portion and continuously changes to that at the central portion.

The X-ray transmittances in the area extending from the central portion to the peripheral portion of the X-ray incident window of such an X-ray image intensifier, and an amount of deformation of the X-ray incident window caused by the atmospheric pressure will be described below.

Figure 6:
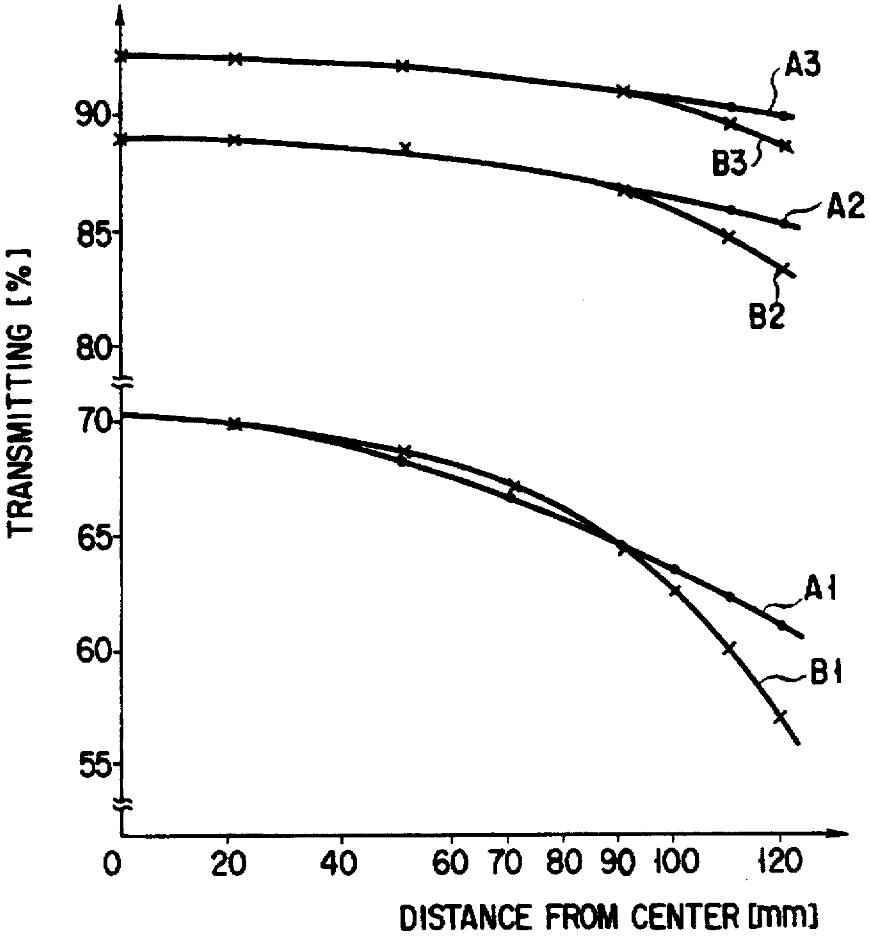
FIG. 6 is a graph showing the radiation transmittances of the X-ray incident window shown in FIG. 4 to compare the radiation transmittances to each other.

FIG. 6 is a graph for comparing the X-ray transmittances in the area extending from the central portion to the peripheral portion. Curves A1, A2, and A3 in FIG. 6 are associated with the present invention and indicate a case wherein the sectional meridian radii of curvature are set to be 135 mm, 193 mm, and 338 mm, at the central, intermediate, and outermost peripheral portions, respectively. Curves B1, B2, and B3 are used to be compared with the curves A1, A2, and A3, and indicate a case wherein the radius of curvature is set to be constant at 170 mm (corresponding to the curve indicated by B in FIG. 4). Each X-ray incident window consists of aluminum and has a spherical surface, a diameter of 230 mm, and a thickness of 1.2 mm. The distance between an X-ray generating source and the central portion of the incident window is set to be 1 m, and each data is obtained when an X-ray transmittance is measured at each position of the inner surface of the incident window from the center of the incident window. Note that the curves A1 and B1 indicate a case wherein an X-ray energy is set to be 30 keV, the curves A2 and B2 indicate a case wherein an X-ray energy is set to be 50 keV, and the curves A3 and B3 indicate a case wherein an X-ray energy is set to be 70 keV.

As is apparent from FIG. 6, according to the present invention, when the meridian radius of curvature of the incident window at the peripheral portion is set to be larger than that at the central portion, the X-ray transmittance at the peripheral portion is larger than that of the incident window having a single radius of curvature. In particular, when the energy of incident X-rays is low (set to be 30 keV), the difference between the X-ray transmittances becomes conspicuous. This difference is mainly caused by the difference between substantial thicknesses of the incident window at the peripheral portion in an X-ray transmission direction.

Figure 7:
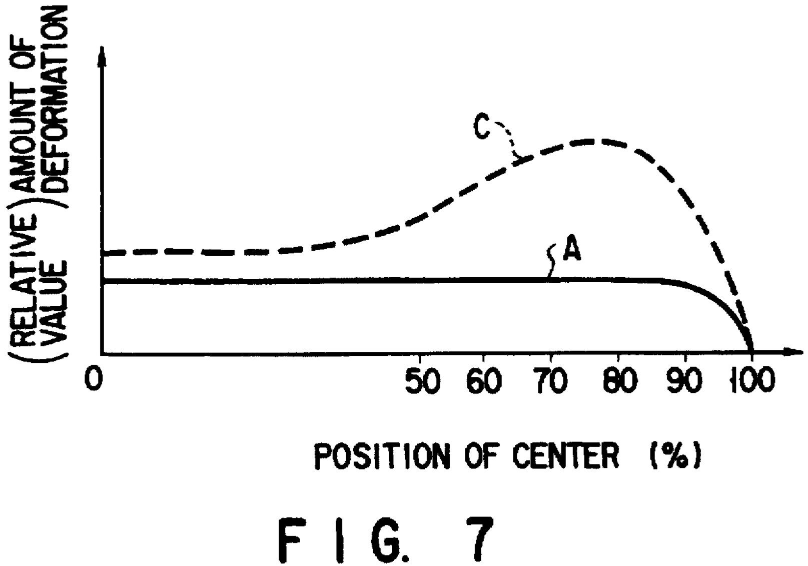
FIG. 7 is a graph showing an amount of deformation and a position from the center of the X-ray incident window shown in FIG. 4.

An amount of deformation of the X-ray incident window caused by the atmospheric pressure when the vacuum vessel is evacuated to set the interior of the vacuum vessel in a vacuum state is indicated as the calculation result shown in FIG. 7. A dotted curve C in FIG. 7 indicates a case wherein the meridian radius of curvature at the peripheral portion is set to be larger than that at the central portion under the condition that the thickness of the X-ray incident window is set to be constant. More specifically, the amount of deformation of the X-ray incident window caused by the atmospheric pressure is maximum at the peripheral portion having a radius of curvature larger than that of the central portion, and the X-ray incident window is displaced inside. For this reason, the electron lens system is deformed. In addition, the material of the input screen directly adhering to the inner surface is partially peeled by the displacement of the X-ray incident window.

Therefore, according to the present invention, since the thickness of the window plate at the peripheral portion is set to be larger than that at the central portion, as indicated by a curve A in FIG. 7, deformation of the incident window can be suppressed, and the amount of deformation in the area extending from the central portion to the peripheral portion can be set to be almost constant. Note that, since the position spaced apart from the center by 100% of the diameter, i.e., the outermost peripheral portion, is held by the high-strength support frame in any case, the amount of deformation of the outermost peripheral portion is almost zero.

The X-ray incident window having the input screen directly adhering to the inner surface thereof serves as part of the vacuum vessel, of a completed X-ray image intensifier, on which the atmospheric pressure acts. However, according to the present invention, the amount of deformation of the incident window is small, and the deformation is uniform in the entire area of the incident window. For this reason, the electron lens system constituted by the input screen and the focusing electrodes is prevented from being undesirably deformed.

Although the X-ray transmittances of the X-ray incident window according to the present invention are slightly lower than those in the distribution indicated by A1 to A3 in FIG. 6 at the peripheral portion, a decrease in X-ray transmittance is very small, and the X-ray transmittance can be kept at a value sufficiently larger than that of the comparative examples B1 to B3. In addition, in an enlargement mode in which an X-ray image transmitted through the central portion of the incident window is enlarged, only an area having a high X-ray transmittance is used, thereby obtaining high X-ray detection efficiency.

Note that a ratio of the thickness of the X-ray incident window at the peripheral portion to the thickness of the X-ray incident window at the central portion, in consideration of the uniformity of X-ray transmittances and the allowance limit of an amount of deformation, falls within a range of 105% to 150%, and more preferably a range of 108% to 130%. A method of manufacturing an X-ray incident window to obtain this thickness distribution is as follows. For example, when a press die is designed to obtain the above thickness distribution when the X-ray incident window is to be pressed in a convex-spherical shape, the X-ray incident window can be easily formed at high accuracy.

The thickness t of the central portion of an X-ray incident window consisting of aluminum or an aluminum alloy is preferably set to be 0.2% or more of the effective maximum diameter Dm of the input screen and 0.4% or less of the effective maximum diameter Dm of the input screen. Therefore, when an X-ray image intensifier having an input screen whose effective maximum diameter Dm is 230 mm is used as an example, and the thickness of the X-ray incident window at the central portion is set within a range of 0.46 mm to 0.92 mm, necessary and sufficient X-ray transmittance and mechanical strength can be assured. Note that even when the thickness of a portion, of the X-ray incident window, occupying less than 50% of an effective visual field used in the enlargement mode is decreased by about 20%, an amount of deformation is very slightly decreased. For this reason, the radiation transmittance in this area can be increased, high X-ray detection efficiency can be obtained, and the contrast and resolution can be increased.

When an aluminum alloy is used as the material of the X-ray incident window, one of aluminum alloys of Nos. 5,000 to 5,999 or Nos. 6,000 to 6,999 of Japanese Industrial Standards (JIS) each having a high mechanical strength is preferably used. In addition, when the X-ray incident window is to be airtightly joined to the support frame by brazing, one of aluminum alloys of Nos. 3,000 to 3,999 of Japanese Industrial Standards (JIS) is preferably used. Note that the additional chemical components of these Al alloys are as follows. That is, each of the Al alloys of Nos. 5,000 to 5,999 of JIS contains Si at 0.3 to 0.6%, Cu at 0.05 to 0.3%, Mn at 0.8 to 1.5%, Mg at 0.2 to 1.3%, and the like. Each of the Al alloys of Nos. 6,000 to 6,999 of JIS contains Si at 0.2 to 0.45%, Cu at 0.04 to 0.2%, Mn at 0.01 to 0.5%, Mg at 0.5 to 5.6%, and the like. Each of the Al alloys of Nos. 3,000 to 3,999 of JIS contains Si at 0.3 to 1.2%, Cu at 0.1 to 0.4%, Mn at 0.03 to 0.8, Mg at 0.35 to 1.5%, and the like.

As shown in FIG. 2, a method of directly adhering and forming the input screen 17 on the inner surface of the X-ray incident window 13 joined to the high-strength support frame 14 will be described below. The inner surface of the X-ray incident window 13 is subjected to a honing process to form a material hardened uneven surface having a height of about several μm, and the material of the inner surface is hardened.

Figure 8:
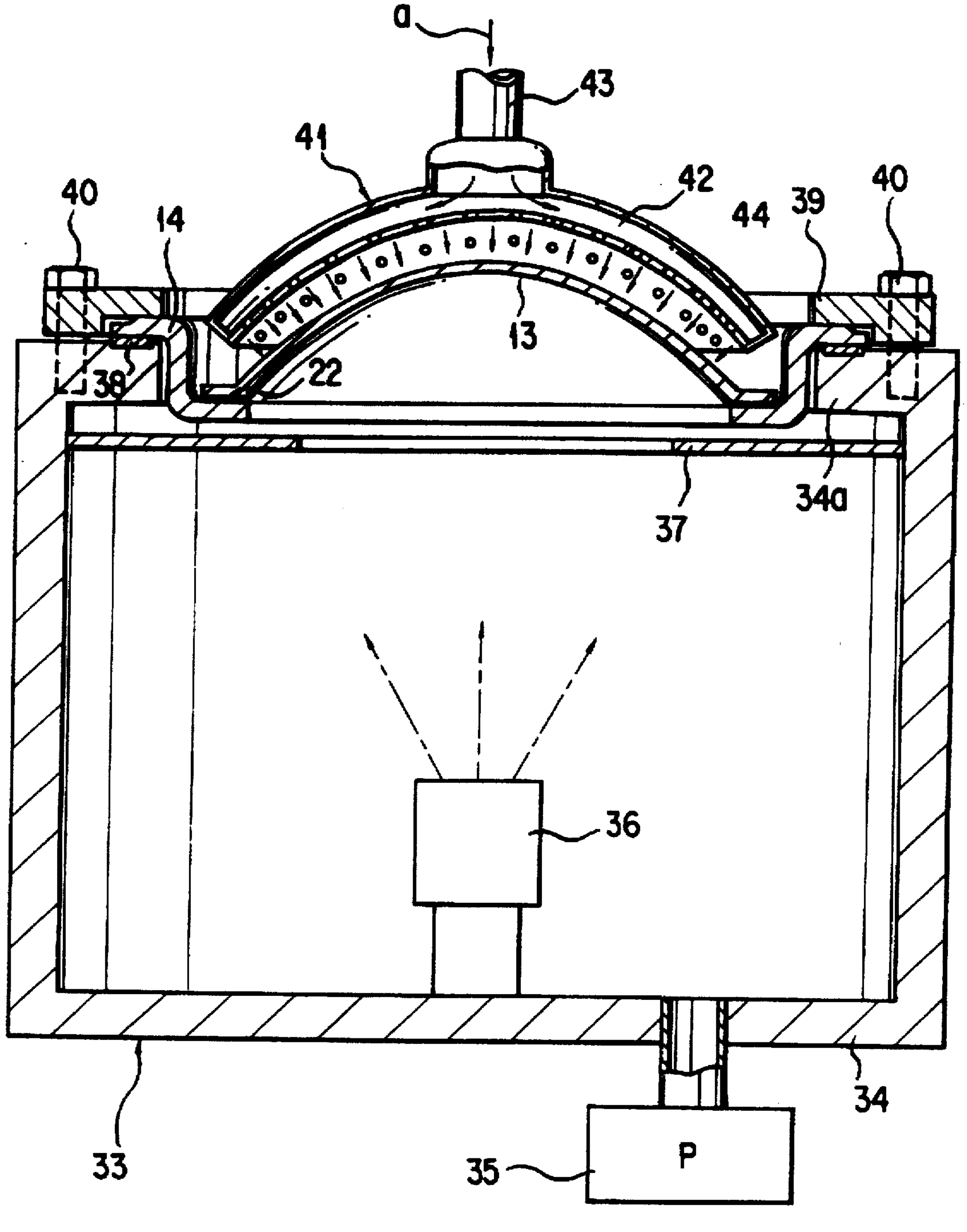
FIG. 8 is a schematic longitudinal sectional view showing a film forming apparatus for forming an input screen of the present invention.

The resultant structure is arranged on the film forming apparatus shown in FIG. 8. More specifically, the X-ray incident window 13 joined to the support frame 14 is attached to a reduced-pressure vessel 34 of a film forming apparatus 33 for forming an input screen such that the x-ray incident window 13 serves as part of the wall of the reduced-pressure vessel, i.e., the lid portion of the reduced-pressure vessel. In the film forming apparatus 33, a vacuum pump 35 is connected to a portion of the reduced-pressure vessel 34, an evaporation source boat 36 is arranged at a predetermined position in the reduced-pressure vessel 34, and a mask 37 for defining a film formation range is arranged. The rear surface of the outer circumferential portion of the high-strength support frame 14 to which the X-ray incident window 13 is airtightly joined is placed, through an airtight packing 38, on an opening portion 34*a* on the upper side of the reduced-pressure vessel 34, and the support frame 14 is airtightly fixed to the opening portion 34*a* with a fastening ring 39 and a plurality of fastening bolts 40. In this manner, the X-ray incident window 13 and the support frame 14 are attached to the film forming apparatus to serve as part of the vessel wall of the reduced-pressure vessel 34 of the film forming apparatus. In addition, the inner surface of the X-ray incident window 13 is arranged to oppose the evaporation source boat 36 at an interval of a predetermined distance.

Moreover, a heat conduction cover 42 of a temperature control unit 41 is arranged adjacent to the outer surface of the X-ray incident window 13 exposed to the outer air. This heat conduction cover 42 is a dome-like vessel having an inner surface shape conforming to the spherical surface of the X-ray incident window 13, and an air supply pipe 43 is connected to the upper portion of the heat conduction cover 42 to supply cooling air as indicated by an arrow a in FIG. 8. The cooling air is sprayed from a large number of ventilation holes 44 formed in the inner surface of the heat conduction cover 42 to the outer surface of the X-ray incident window 13. In addition, although not shown in FIG. 8, a proper number of temperature sensors for measuring the temperatures of the X-ray incident window 13 and the distribution of the temperatures are arranged at proper positions on the outer surface of the incident window.

As described above, the X-ray incident window 13 is attached to the film forming apparatus 33 for forming an input screen such that the X-ray incident window 13 serves as part of the vessel wall of the reduced-pressure vessel of the film forming apparatus 33, and the reduced-pressure vessel is set to have a predetermined degree of vacuum. In this manner, first, an aluminum thin film serving as a light-reflecting material is formed on the inner surface of the X-ray incident window 13 to have a thickness of about 2,000 Å.

An X-ray excitation phosphor layer is formed on the aluminum thin film while the temperatures of the X-ray incident window and the distribution of the temperatures are controlled, as needed, by the temperature control unit 41 arranged on the outer air side of the X-ray incident window 13. This phosphor layer consists of sodium (Na)-activated caesium iodide (CsI). The first phosphor layer is deposited at a pressure of $4.5\times10^{-1}$ Pa to have a thickness of about 400 μm, and the second phosphor layer is deposited at a pressure of $4.5\times10^{-3}$ Pa on the first phosphor layer to have a thickness of about 20 μm. A transparent conductive film adheres on the second phosphor layer.

During formation of the films for the input screen, the X-ray incident window 13 receives an external pressure corresponding to the atmospheric pressure. However, since the X-ray incident window 13 is joined and fixed to the high-strength support frame 14 and has a structure having a small amount of deformation, the X-ray incident window 13 is kept in the same state as a completed state wherein the X-ray incident window 13 serves as part of the vacuum vessel of the image intensifier. Therefore, the input screen is formed to have the same shape as that of the completed input screen. In addition, since the temperatures of the X-ray incident window can be relatively freely controlled, an input screen having a desired crystal grain size can be formed.

Figure 9:
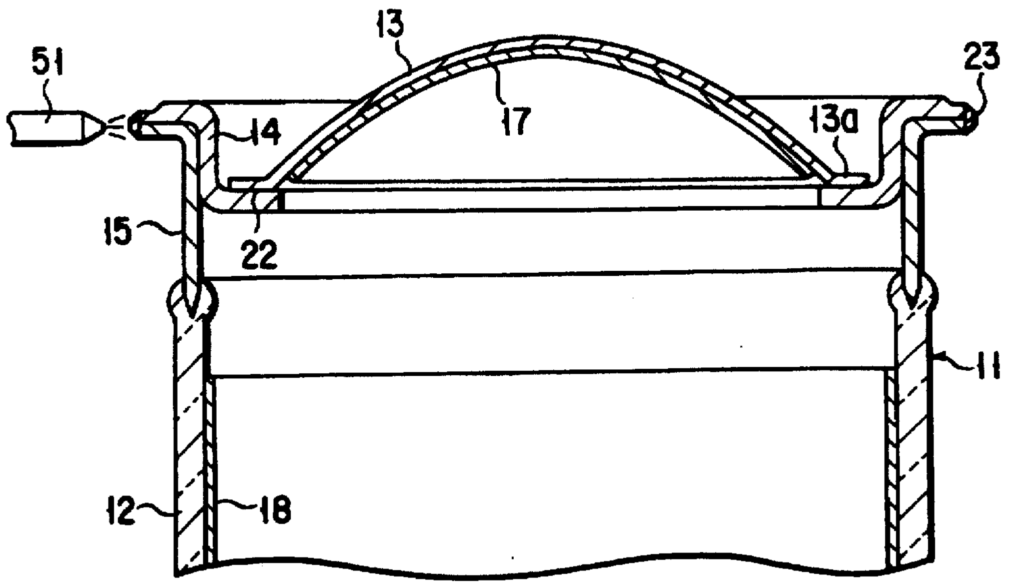
FIG. 9 is a longitudinal sectional view showing the main part of a vacuum vessel of the present invention to show the joined state of the vacuum vessel.

As shown in FIG. 9, the support frame 14 integrally formed with the X-ray incident window 13 on which the input screen 17 is partially formed is matched with the sealing and adhering metal ring 15 consisting of an iron-nickel-cobalt alloy and joined to the end of the glass housing 12 serving as part of the vacuum vessel in advance, and the entire peripheral portion of the support frame 14 is airtightly welded to the sealing and adhering metal ring 15 with a torch 51 of an arc welding apparatus. Thereafter, the vacuum vessel is evacuated, and a photocathode layer constituting part of the input screen 17 is evaporated in the intensifier, thereby completing an x-ray image intensifier. In this manner, the radiation image intensifier, can be obtained, which has the radiation incident window slightly deformed by the atmospheric pressure, rarely degrades the uniformity of radiation transmittances in the entire area of the incident window, is free from peeling of the input screen and deformation of the electron lens system, and has a preferable contrast and preferable resolution characteristics.

Figure 11:
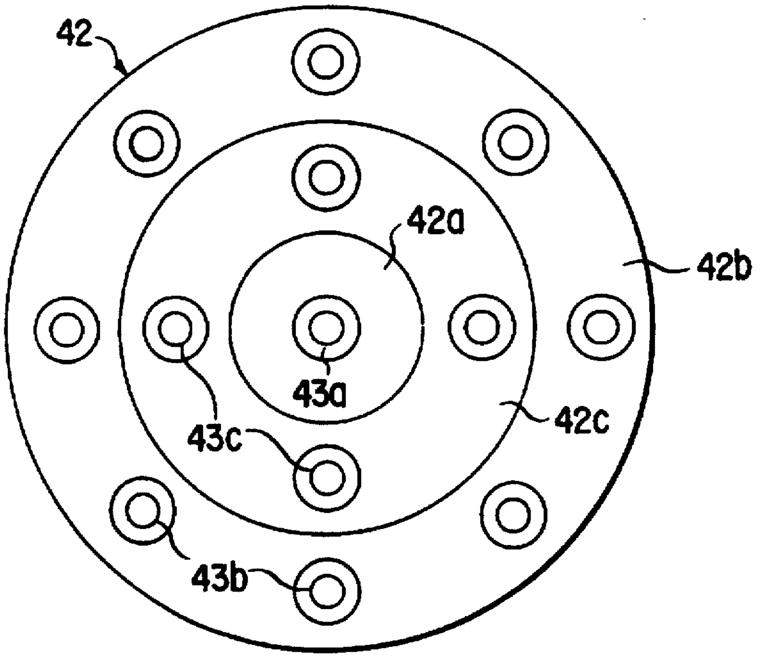
FIG. 11 is a developed view showing the upper surface of a heat conduction cover in FIG. 10.
Figure 10:
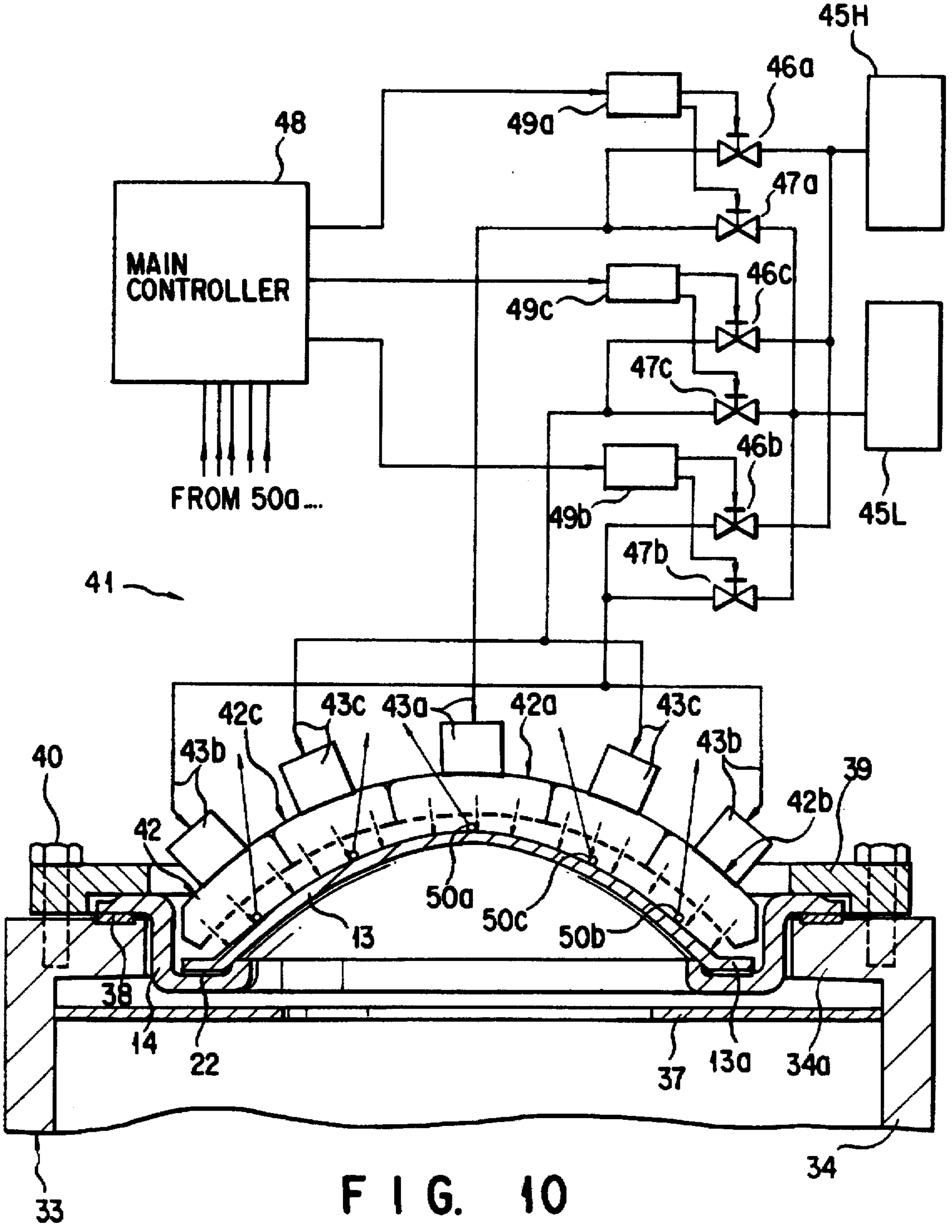
FIG. 10 is a longitudinal sectional view showing the main part of a film forming apparatus according to another embodiment of the present invention.

FIGS. 10 and 11 show an embodiment of a method and apparatus for forming an input screen while three areas i.e., a central area, an outer circumferential area, and an intermediate area therebetween, obtained by roughly dividing the temperature control area of an X-ray incident window are independently controlled in temperature. A temperature control unit 41 has the following arrangement. That is, a heat conduction cover 42 is divided into a central portion 42*a*, a ring-like outer circumferential portion 42*b*, and a ring-like intermediate portion 42*c*, and pipes 43*a* to 43*c* for independently supplying temperature control media (to be referred to as gases) whose temperatures are respectively controlled to be proper temperatures are connected to the central portion 42*a*, the outer circumferential portion 42*b*, and the intermediate portion 42*c*, respectively. As each temperature control gas, for example, air, a high-temperature steam, a liquid nitrogen gas having a very low temperature, or a gas mixture obtained by mixing the air, steam, and liquid nitrogen gas can be used.

In order to supply gases having different temperatures to the areas of the heat conduction cover 42, respectively, two gas sources 45H and 45L are prepared. For example, a gas heated to 200° C. is stored in the gas source 45H, and a gas heated to 80° C. is stored in the gas source 45L. Both the gas sources are connected to the gas supply pipes 43*a* to 43*c* through flow control valves 46*a* to 47*c* which are independently connected to the gas sources 45H and 45L, and these gases are supplied to the central portion 42*a*, the outer circumferential portion 42*b*, and the intermediate portion 42*c* at a proper mixing ratio. In order to control this mixing ratio, control signals sent from a main controller 48 are supplied to valve controllers 49*a* to 49*c*, respectively, and the flow control valves 46*a* to 47*c* are independently controlled by the control signals sent from the valve controllers 49*a* to 49*c*. A proper number of temperature sensors 50*a* to 50*c* are arranged at proper positions on the portions of the outer surface of the X-ray incident window 13 such that the temperatures of the incident window can be detected, and temperature signals from the temperature sensors 50*a* to 50*c* are output to the main controller 48 as indicated by arrows in FIG. 10.

In this manner, the temperatures of the divided central, outer circumferential, and intermediate portions of the X-ray incident window 13 are independently set by the main controller 48 of the temperature control unit 41, and these temperatures can be arbitrarily controlled with time. A phosphor layer consisting of Na-activated CsI can be deposited while the temperatures of the central portion, intermediate portion, and outer circumferential portion of the X-ray incident window 13 are kept constant, e.g., at 120° C., 140° C., and 160° C., from the beginning to the end, or are gradually decreased. In this manner, it is possible to form a phosphor layer having the distribution of columnar crystal grains which gradually increase in size from the central portion to the outer circumferential portion. According to an image intensifier having the above input screen, the uniformity of the brightness distribution of an output image corresponding to an X-ray image can be improved because the brightness at the peripheral portion is improved better than that at the central portion.

When a program for controlling the temperatures of the gases sprayed onto the X-ray incident window is properly set, as needed, using the above temperature control unit, the temperatures of the x-ray incident window and the distribution of the temperatures during formation of a film, can be accurately controlled in a wide area over time. Note that, when the airtight structure and drainage paths of each portion are made proper, water and other liquids can be used as temperature control media.

Figure 12:
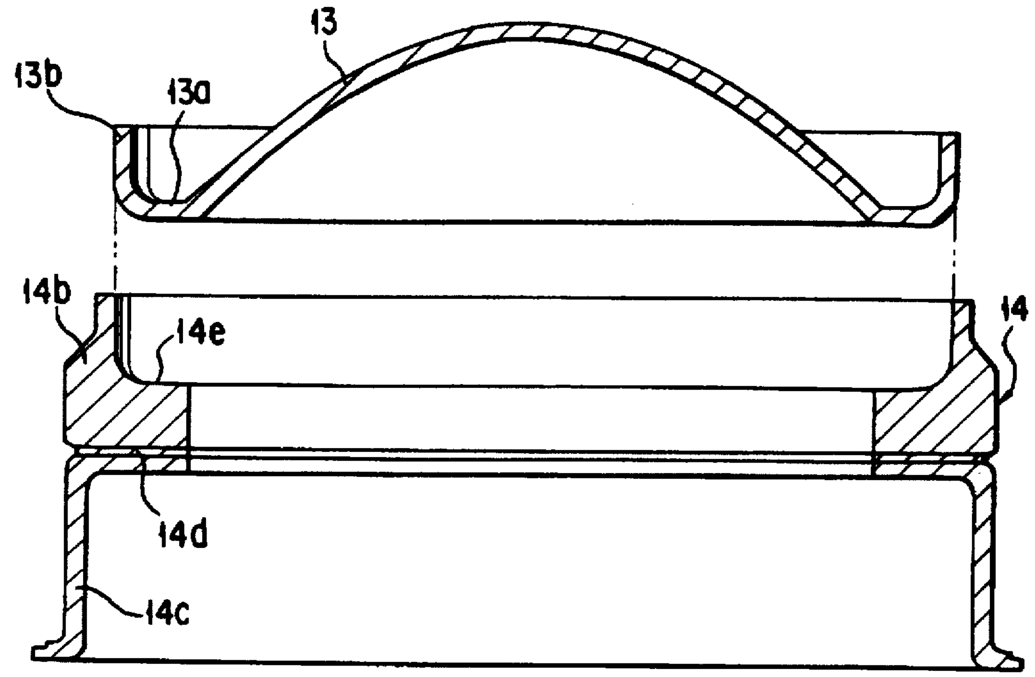
FIG. 12 is a longitudinal sectional view showing a radiation incident window portion according to still another embodiment of the present invention.
Figure 13:
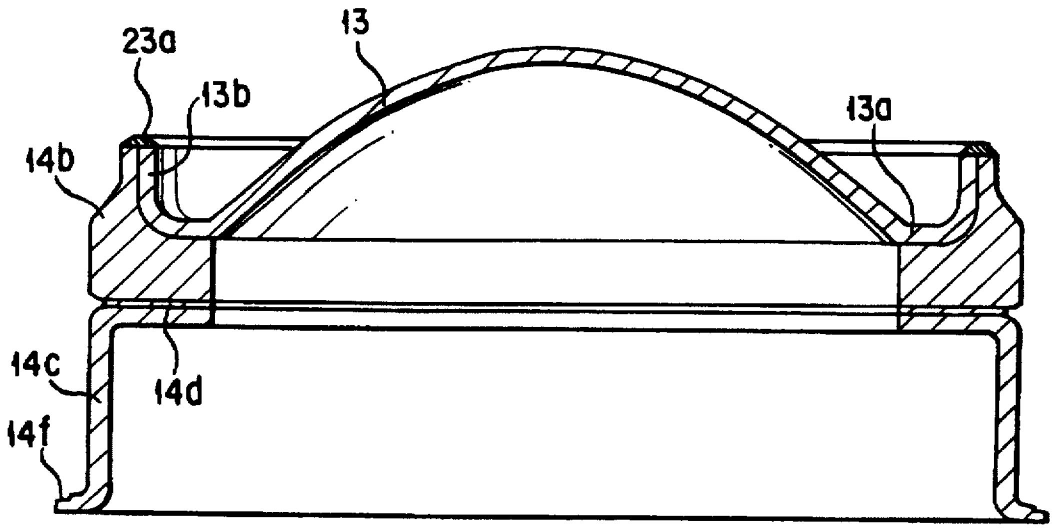
FIG. 13 is a longitudinal sectional view showing the joined state between the incident window and a support frame in FIG. 12.

According to the embodiment shown FIG. 12, an X-ray incident window 13 and a high-strength support frame 14 are manufactured in advance to have predetermined shapes and predetermined structures, respectively, and the X-ray incident window 13 and the support frame 14 are integrally Joined to each other as shown in FIG. 13. The X-ray incident window 13 consists of an aluminum alloy, and a short cylindrical portion 13*b* is shaped to be bent integrally with the outer circumferential portion of the support frame 14. The high-strength support frame 14 is obtained such that a first ring 14*b* consisting of an aluminum alloy and having a large thickness is airtightly joined to a second ring 14*c* consisting of an iron alloy or stainless steel through an intermediate material 14*d*. The outer circumferential portion of the X-ray incident window is matched with a stepped portion 14*e* which is formed on the inner circumferential portion of the first ring 14*b* in advance such that the peripheral flange portion 13*a* and the short cylindrical portion 13*b* are fitted on the stepped portion 14*e*, and the entire peripheral portion of the contact end portion between the thin end portion of the first ring 14*b* and the short cylindrical portion 13*b* of the X-ray incident window is airtightly welded. This welded portion is indicated by reference numeral 23*a* in FIG. 13.

Figure 14:
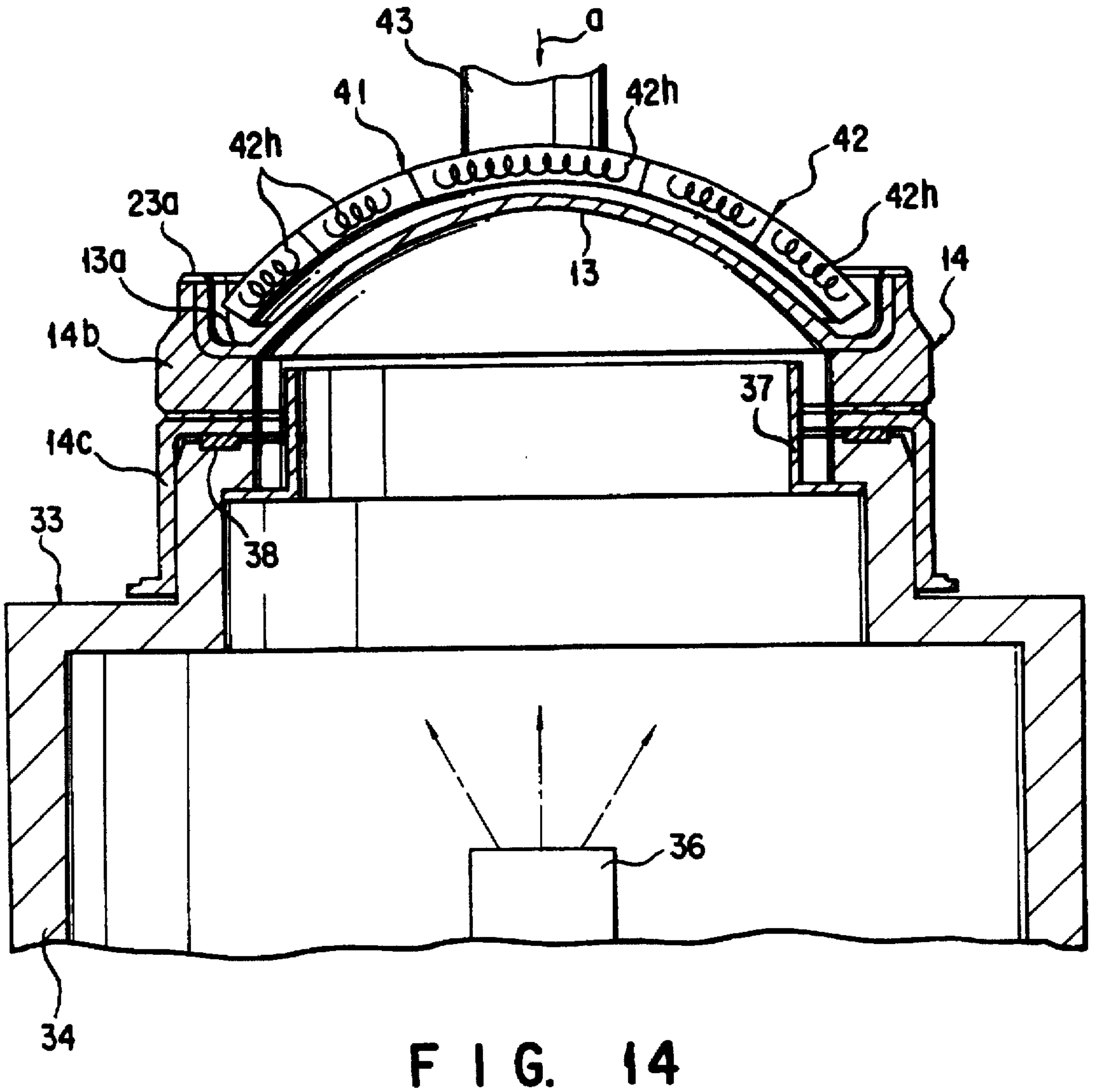
FIG. 14 is a longitudinal sectional view showing the film formation state of an input screen in FIG. 13.

As shown in FIG. 14, the inner circumferential surface of the second ring 14*c* of the support frame 14 to which the X-ray incident window is joined is attached to the reduced-pressure vessel of a film forming apparatus 33 for forming an input screen such that the inner circumferential surface serves as part of the wall of the reduced-pressure vessel. The pressure in the reduced-pressure vessel is set to be a predetermined pressure, and the material of an input screen is evaporated while the temperatures of the X-ray incident window and the distribution of the temperatures are controlled, as needed, by a heat conduction cover 42 of a temperature control unit 41 arranged on the outer air side of the X-ray incident window 13, thereby depositing the material on the inner surface of the incident window. Note that this embodiment shows an arrangement in which the heat conduction cover 42 of the temperature control unit 41 is divided into a plurality of areas and incorporates an air supply means and a plurality of heaters 42*h* such that the temperatures of the areas can be independently controlled. A cooling unit and a heating unit may be arranged in place of the temperature control unit 41, as a matter of course.

Thereafter, an opening end portion 14*f* of the second ring 14*c* of the support frame is airtightly welded to the housing of a vacuum vessel (not shown). In this case, since the welded portion is located at a position spaced apart from the input screen of the X-ray incident window by a relatively long distance as a heat conduction path, the input screen will not be damaged by heat generated by welding.

Figure 15:
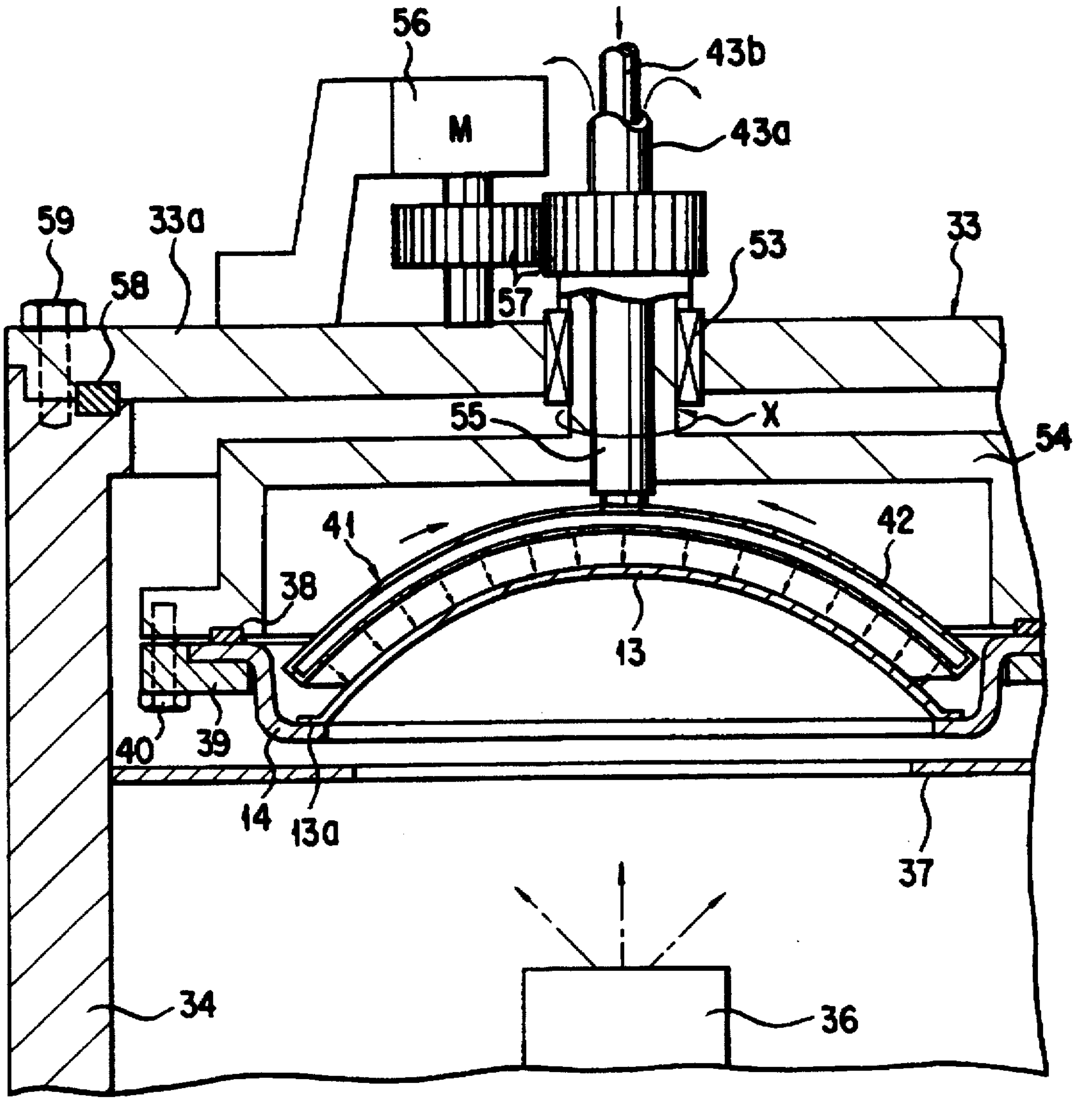
FIG. 15 is a longitudinal sectional view showing the film formation state of an input screen according to still another embodiment of the present invention.

The embodiment shown in FIG. 15 will describe an apparatus for forming an input screen on the inner surface of an X-ray incident window 13 while the X-ray incident window 13 is rotated. A film forming apparatus 33 has an airtight bearing 53 at the central portion of a lid 33*a* of the film forming apparatus 33, and a shaft 55 of a rotatable support member 54 extends through the airtight bearing 53. The shaft 55 is constituted by ventilation pipes 43*a* and 43*b*, of a temperature control unit 41, having a double structure, and the shaft 55 is rotated together with the rotatable support member 54. For this reason, the shaft 55 and the rotatable support member 54 are rotatably driven, through gears 57, by a motor 56 fixed on the lid 33*a*. A support frame 14 to which the X-ray incident window 13 is joined is airtightly attached to the rotatable support member 54 located inside the film forming apparatus 33. These components are attached to the lid 33*a* of the film forming apparatus, and the lid 33*a* is airtightly fixed to the upper portion of a reduced-pressure vessel wall 34 with a packing 58 and fastening bolts 59. In this manner, the X-ray incident window 13 constitutes part of the reduced-pressure vessel wall together with the rotatable support member 54. An input screen is formed on the inner surface of the X-ray incident window while the above rotatable components are rotated in the direction indicated by an arrow X in FIG. 15. In this case, the input screen can be formed while the temperatures of the X-ray incident window and the distribution of the temperatures are controlled, as needed, by the temperature control unit 41.

Figure 16:
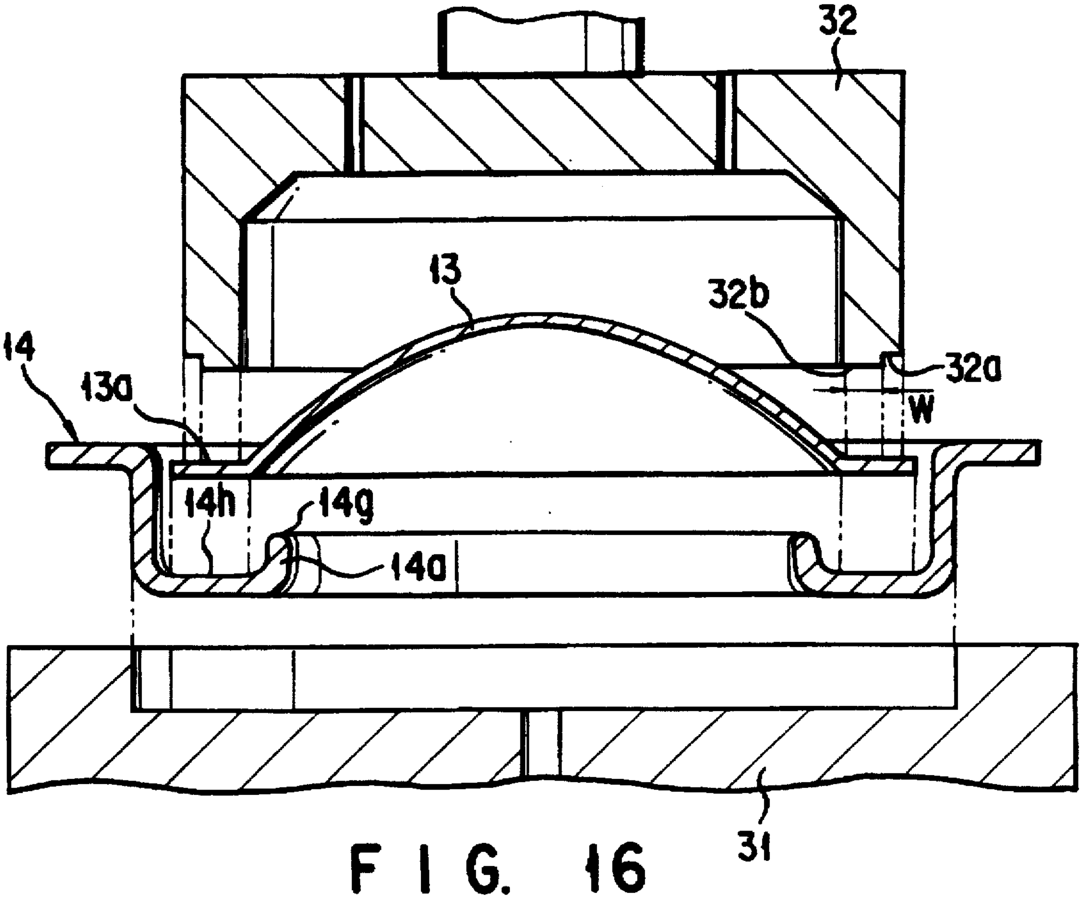
FIG. 16 is a longitudinal sectional view showing the joined state between an incident window and a support frame according to still another embodiment of the present invention.

In the embodiment shown in FIG. 16, a bent lock portion 14*a* is formed integrally with the inner circumferential portion of a support frame 14, and an end 14*g* of the bent lock portion 14*a* is rounded. A flat peripheral flange portion 13*a* of an X-ray incident window 13 is arranged on a circumferentially recessed portion 14*h* of the support frame 14, and the peripheral flange portion 13*a* of the incident window is forcibly pressed into the recessed portion 14*h* and joined to the recessed portion 14*h* by joining units 31 and 32. Note that the joining unit 32 being in contact with the peripheral flange portion of the incident window has a notch 32*a* at the outer circumferential portion of the joining unit 32, and the material of the flange portion 13*a* rarely flows inside but flows outside while the flange portion 13*a* is pressed against and joined to the high-strength support frame 14. A radial width w of a pressure surface 32*b* being in contact with the peripheral flange portion 13*a* of the incident window is set to be 0.5 mm or more and less than 5 mm, e.g., 2 mm.

Figure 17:
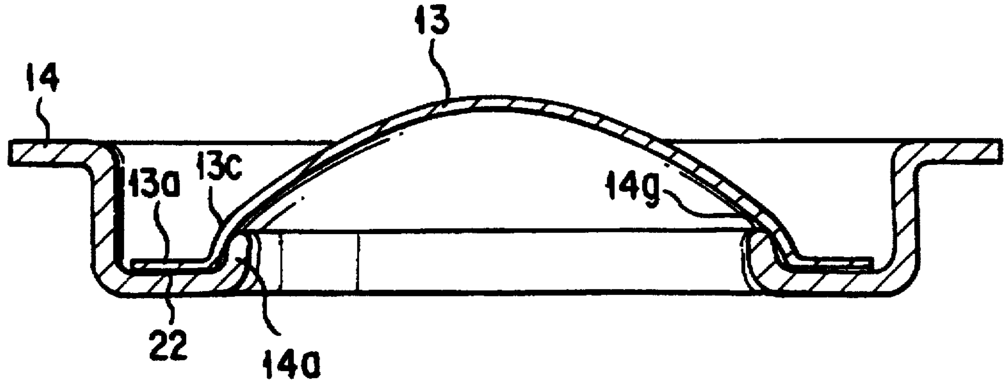
FIG. 17 is a longitudinal sectional view showing the main part of the incident window portion obtained by joining in FIG. 16.

When the X-ray incident window 13 is airtightly pressed against and joined to the high-strength support frame 14 as described above, as shown in FIG. 17, the peripheral flange portion 13*a* of the X-ray incident window is shaped to form a short tapered upright portion 13*c* along the outer circumferential portion of the bent lock portion 14*a* of the high-strength support frame 14. Since this upright portion 13*c* has a function of suppressing deformation of the outer circumferential portion of the X-ray incident window caused by the atmospheric pressure, the upright portion 13*c* is effective to prevent deformation of the window when an input screen is formed using this X-ray incident window as part of the reduced-pressure vessel wall of the film forming apparatus.

Figure 18:
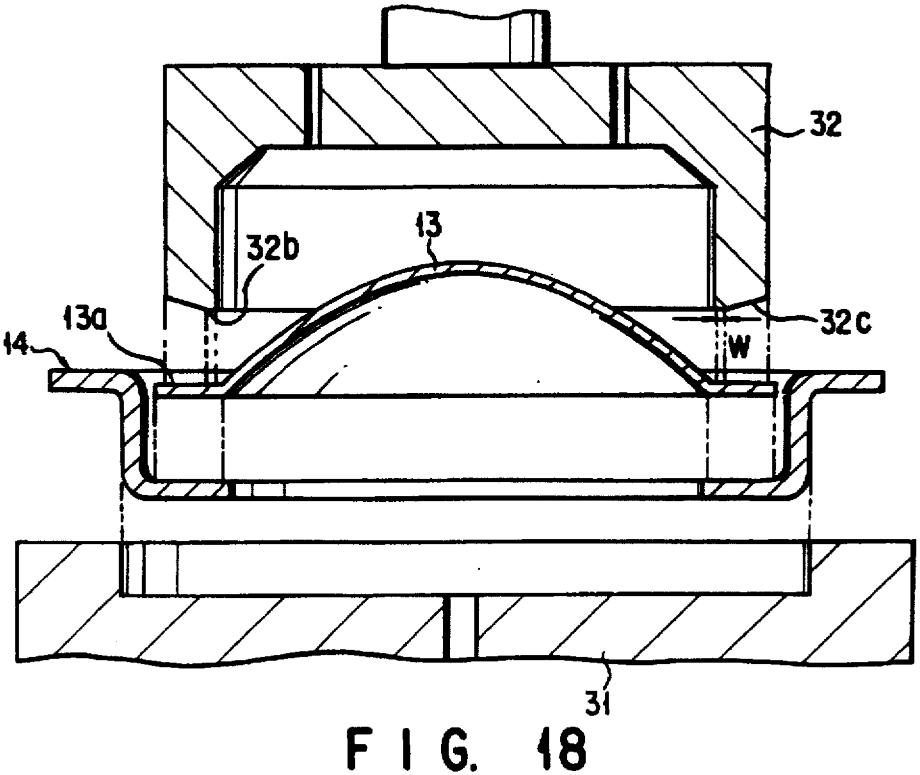
FIG. 18 is a longitudinal sectional view showing the joined state between an incident window and a support frame according to still another embodiment of the present invention.

In the embodiment shown in FIG. 18, a tapered surface 32*c* is formed on the outer circumferential portion of a joining unit 32 for pressing an flange portion 13*a* of an X-ray incident window so that the material of the flange portion 13*a* easily flows outside. The angle of the tapered surface 32*c* is set to be, e.g., about 6°. Therefore, deformation of the X-ray incident window in the joining process can be suppressed.

Figure 19:
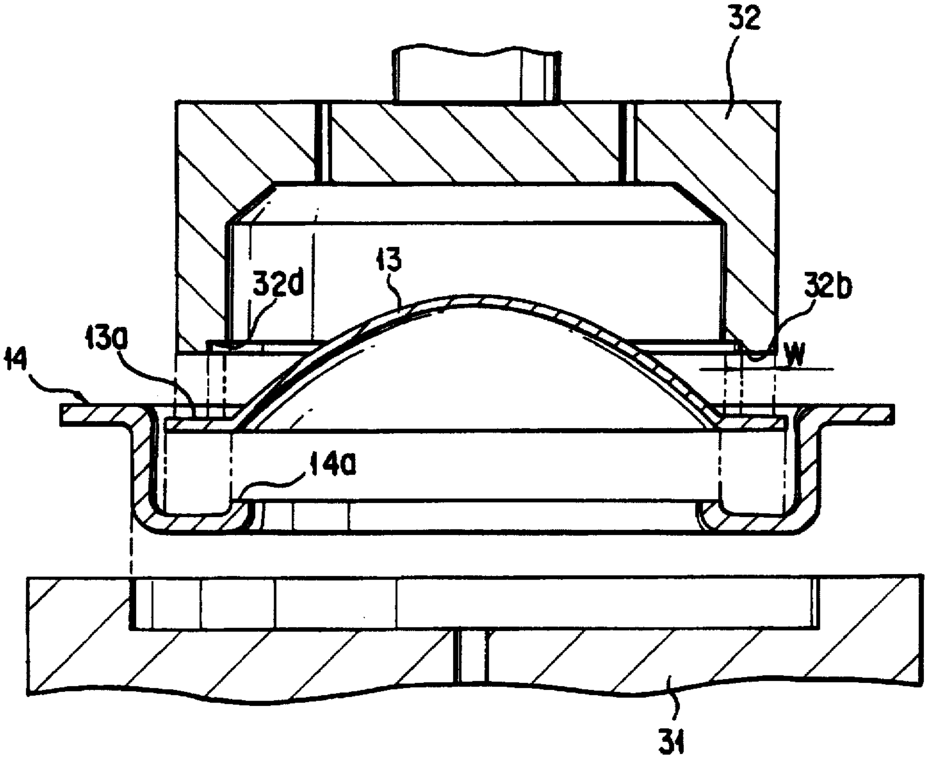
FIG. 19 is a longitudinal sectional view showing the joined state between an incident window and a support frame according to still another embodiment of the present invention.

In the embodiment shown in FIG. 19, a notch 32*d* is formed in the inner circumferential portion of a joining unit 32 for pressing an peripheral flange portion 13a. Note that a bent lock portion 14a is formed integrally with the inner circumferential portion of a support frame 14 to prevent deformation of an incident window.

Note that, when no notch or tapered surface is formed on the joining unit 32 for pressing the flange portion 13a, and a radial width w of the pressure surface being in contact with the flange portion 13a is set within the above-described range, the material is not torn, and a highly reliable airtight joined state can be obtained.

The material of an X-ray incident window 13 is not limited to aluminum or an aluminum alloy, and a thin plate consisting of beryllium, an alloy of beryllium, titanium, or an alloy of titanium and having a high transmittance with respect to X-rays can also be used as the material of the X-ray incident window 13.

As described above, according to the present invention, deformation of a radiation incident window caused by the atmospheric pressure can be suppressed, a uniform radiation transmittance can be maintained in all the areas of the incident window, and peeling of an input screen and deformation of an electron lens system can be suppressed. Therefore, a radiation image intensifier having a preferable contrast and preferable resolution characteristics can be realized with almost no degradation of the uniformity of radiation transmittances.

In addition, according to the manufacturing method of the present invention, in the step of forming an input screen, the temperatures of a convex-spherical radiation incident window which is exposed to the outer air can be directly controlled, an input screen having desired characteristics can be manufactured with desired reproducibility. Since a radiation incident window in the step of forming an input screen by vacuum deposition or the like is set in a state in which the radiation incident window is influenced by the same atmospheric pressure as that of the radiation incident window of a completed image intensifier, the film formation state of the input screen is almost equal to the state of the input screen of the completed image intensifier. Moreover, the radiation incident window is rarely deformed during formation of the input screen, and the radiation incident window of the completed image intensifier is rarely deformed. Therefore, a radiation image intensifier having desired characteristics can be obtained.

Additional advantages and modifications will readily occur to those skilled in the art. Therefore, the invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. A method of manufacturing a radiation image intensifier, comprising the steps of:

airtightly joining a periphery of a radiation incident window formed to have a convex-spherical shape to a support frame;

attaching said radiation incident window to a reduced-pressure vessel of a film forming apparatus such that said radiation incident window serves as part of a wall of said reduced-pressure vessel;

forming an input screen for converting a radiation image into a photoelectron image on an inner surface of said radiation incident window by depositing a film on said inner surface of said radiation incident window;

airtightly joining said radiation incident window to an opening section of a vacuum vessel; and evacuating said vacuum vessel.

2. A method according to claim 1, wherein the attaching step includes the step of mechanically and airtightly coupling said support frame of said radiation incident window with said reduced-pressure vessel.

3. A method according to claim 1, wherein the airtightly joining step includes the step of shaping said radiation incident window such that said radiation incident window has a sectional meridian radius of curvature at a peripheral portion of said radiation incident window larger than that at a central portion of said radiation incident window and has a thickness at the peripheral portion larger than that at the central portion, and joining said radiation incident window to said support frame.

4. A method according to claim 1, wherein the input screen forming step includes the step of arranging a temperature control unit for controlling a temperature of said incident window on a surface of said radiation incident window being in contact with the outer air such that heat is conducted from said temperature control unit to said radiation incident window, and forming an input screen while the temperature of said incident window is controlled by said temperature control unit.

5. A method according to claim 4, wherein the input screen forming step includes the step of forming an input screen while temperatures of a plurality of areas of said radiation incident window are controlled to be different temperatures, respectively.

* * * * *